United States Patent
Tsukamoto et al.

(10) Patent No.: US 10,774,902 B2
(45) Date of Patent: Sep. 15, 2020

(54) CONTROL DEVICE OF VEHICLE

(71) Applicant: TOYOTA JIDOSHA KABUSHIKI KAISHA, Toyota-shi (JP)

(72) Inventors: Norihiro Tsukamoto, Toyota (JP); Masakazu Owatari, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/354,537

(22) Filed: Mar. 15, 2019

(65) Prior Publication Data

US 2019/0285146 A1 Sep. 19, 2019

(30) Foreign Application Priority Data

Mar. 15, 2018 (JP) .................................. 2018-048624

(51) Int. Cl.
F16H 59/18 (2006.01)
F16H 61/04 (2006.01)
F16H 3/66 (2006.01)

(52) U.S. Cl.
CPC .......... *F16H 3/66* (2013.01); *F16H 2200/006* (2013.01); *F16H 2200/2002* (2013.01); *F16H 2200/2097* (2013.01)

(58) Field of Classification Search
CPC ....... F16H 2059/186; F16H 2061/0488; F16H 61/04
See application file for complete search history.

(56) References Cited

U.S. PATENT DOCUMENTS

| 2011/0125375 A1* | 5/2011 | Tokura | ................... F16H 1/0437 701/51 |
| 2011/0239800 A1 | 10/2011 | Sekii et al. | |
| 2015/0291165 A1 | 10/2015 | Mitsuyasu et al. | |
| 2016/0084376 A1 | 3/2016 | Kim et al. | |
| 2019/0135267 A1* | 5/2019 | Kim | ....................... B60W 20/15 |

FOREIGN PATENT DOCUMENTS

| CN | 102725563 | 10/2012 |
| CN | 105209798 | 12/2015 |
| JP | 2012-215211 | 11/2012 |
| WO | WO 2014/068726 A1 | 5/2014 |

* cited by examiner

*Primary Examiner* — Tisha D Lewis
(74) *Attorney, Agent, or Firm* — Oblon, McClelland, Maier & Neustadt, L.L.P.

(57) ABSTRACT

A control device of a vehicle including a multi-speed automatic transmission includes a first engagement control portion selecting a selected gear shift position having a synchronous rotation speed lower than an actual input rotation speed of the multi-speed automatic transmission at the time of return from the coasting running due to the depressing operation of the accelerator pedal and increasing an engagement force of an engagement element establishing the selected gear shift position to immediately increase a drive force of the vehicle; and a second engagement control portion engaging the engagement element establishing the target gear shift position when the actual input rotation speed of the multi-speed automatic transmission reaches a determination rotation speed set for determination of attainment to the synchronous rotation speed of the target gear shift position.

16 Claims, 7 Drawing Sheets

FIG.3

|      | C1 | C2 | C3 | C4 | B1 | B2 |
|------|----|----|----|----|----|----|
| 1st  | O  |    |    |    |    | O  |
| 2nd  | O  |    |    |    | O  |    |
| 3rd  | O  |    | O  |    |    |    |
| 4th  | O  |    |    | O  |    |    |
| 5th  | O  | O  |    |    |    |    |
| 6th  |    | O  |    | O  |    |    |
| 7th  |    | O  | O  |    |    |    |
| 8th  |    | O  |    |    | O  |    |
| Rev  |    |    | O  |    |    | O  |

O: ENGAGEMENT BLANK: RELEASE

CONTROL DEVICE OF VEHICLE

The disclosure of Japanese Patent Application No. 2018-048624 filed on Mar. 15, 2018 including the specification, drawings and abstract is incorporated herein by reference in its entirety.

FIELD OF THE INVENTION

The present invention relates to a control device of a vehicle including a multi-speed automatic transmission and, more particularly, to a technique at the time of return from coasting running in which an engine is disconnected from wheels to normal running in which the engine is coupled to the wheels.

DESCRIPTION OF THE RELATED ART

In a vehicle including a multi-speed automatic transmission having a plurality of engagement elements and changing a combination of a predetermined number of, for example, a pair of, engagement elements out of the plurality of engagement elements to achieve each of a plurality of gear shift positions, for example, when a depressed accelerator pedal is released during running with a D range (a normal running range using automatic gear shifting of all forward gear shift positions) of the automatic transmission, the transmission is brought into a neutral state to release a power transmission path and allow the vehicle to run by inertia, and preparations in the engagement elements are made such as adjustment of hydraulic pressures of the engagement elements for establishing a gear shift position so as to immediately establish the gear shift position corresponding to a vehicle speed when the accelerator pedal is subsequently depressed. For example, this corresponds to a control device of a vehicle including a multi-speed automatic transmission described in paragraph 0004 of Patent Document 1.

PRIOR ART DOCUMENT

Patent Document

Patent Document 1: Japanese Laid-Open Patent Publication No. 2012-215211

SUMMARY OF THE INVENTION

Technical Problem

The control device of the vehicle including the multi-speed automatic transmission as described above has no drive force generated after a driver's depressing operation of the accelerator pedal until formation of a gear shift position and therefore has a problem that if an input rotation number of the multi-speed automatic transmission is significantly different from a synchronous rotation speed of a target gear shift position of the automatic transmission, a delay time is required before formation of the target gear shift position, which gives the driver a sluggish feeling at the time of reacceleration of the vehicle.

The present invention was conceived in view of the situations and it is therefore an object of the present invention to provide a control device of a vehicle including a multi-speed automatic transmission which promptly generates a drive force when a driver performs a depressing operation of an accelerator pedal during coasting running of the vehicle with the transmission set to a neutral state.

Solution to Problem

To achieve the above object, a first aspect of the present invention provides a control device of a vehicle including (a) a multi-speed automatic transmission applied to a vehicle including a multi-speed automatic transmission including a plurality of engagement elements and establishing each of a plurality of gear shift positions by changing a combination of a predetermined number of engagement elements out of the plurality of engagement elements, the control device bringing the multi-speed automatic transmission into a neutral state by releasing one of the predetermined number of engagement elements in coasting running according to a releasing operation of an accelerator pedal and establishing a target gear shift position corresponding to a vehicle running state so that the vehicle is returned from the coasting running when a depressing operation of the accelerator pedal is made to return from the coasting running, the control device comprising: (b) a first engagement control portion selecting a selected gear shift position having a synchronous rotation speed lower than an actual input rotation speed of the multi-speed automatic transmission at the time of return from the coasting running due to the depressing operation of the accelerator pedal and increasing an engagement force of an engagement element establishing the selected gear shift position to immediately increase a drive force of the vehicle; and (c) a second engagement control portion engaging the engagement element establishing the target gear shift position when the actual input rotation speed of the multi-speed automatic transmission reaches a determination rotation speed set for determination of attainment to the synchronous rotation speed of the target gear shift position.

A second aspect of the present invention provides the control device of a vehicle including a multi-speed automatic transmission recited in the first aspect of the invention, wherein (d) the first engagement control portion sets as the selected gear shift position a gear shift position on a lowermost speed side out of the gear shift positions each having a synchronous rotation speed lower than the actual input rotation speed of the multi-speed automatic transmission.

A third aspect of the present invention provides the control device of a vehicle including a multi-speed automatic transmission recited in the first or second aspect of the invention, wherein the first engagement control portion limits the selected gear shift position so as not to be a gear shift position on the lower speed side than the target gear shift position.

A fourth aspect of the present invention provides the control device of a vehicle including a multi-speed automatic transmission recited in any one of the first to third aspects of the invention, wherein when the actual input rotation speed of the multi-speed automatic transmission is lower than a synchronous rotation speed of a highest-speed gear shift position at the time of return from coasting running due to the depressing operation of the accelerator pedal, the first engagement control portion delays selection of the selected gear shift position until the actual input rotation speed of the multi-speed automatic transmission becomes equal to or greater than the synchronous rotation speed of the highest-speed gear shift position.

A fifth aspect of the present invention provides the control device of a vehicle including a multi-speed automatic transmission recited in any one of the first to fourth aspects of the invention, wherein the target gear shift position is decided from a shift diagram stored in advance based on an actual vehicle speed and a drive power request amount at the time of return from the coasting running due to the depressing operation of the accelerator pedal.

Advantageous Effects of Invention

According to the control device of the vehicle including the multi-speed automatic transmission recited in the first aspect of the invention, at the time of return from coasting running to normal running of the vehicle due to a depressing operation of the accelerator pedal, the first engagement control portion selects the selected gear shift position having the synchronous rotation speed lower than the actual input rotation speed of the multi-speed automatic transmission and increases the engagement force of the engagement element establishing the selected gear shift position to immediately increase the drive force of the vehicle, and subsequently, when the actual input rotation speed of the multi-speed automatic transmission reaches the determination rotation speed set for determination of attainment to the synchronous rotation speed of the target gear shift position, the second engagement control portion engages the engagement element establishing the target gear shift position. As a result, the engagement force of the engagement element establishing the selected gear shift position is increased so that the drive force of the vehicle is immediately increased to reduce a difference between the input rotation speed of the multi-speed automatic transmission and the synchronous rotation speed of the target gear shift position before the target gear shift position is established, and therefore, in the case that the driver performs the depressing operation of the accelerator pedal during coasting running with the transmission set to the neutral state, the drive force can promptly be generated.

According to the control device of the vehicle including the multi-speed automatic transmission recited in the second aspect of the invention, the first engagement control portion selects as the selected gear shift position the gear shift position on the lowermost speed side out of the gear shift positions each having the synchronous rotation speed lower than the actual input rotation speed of the multi-speed automatic transmission. As a result, even if the input rotation speed of the multi-step automatic transmission is significantly different from the synchronous rotation speed of the target gear shift position, the drive force of the vehicle is immediately increased and the difference between the input rotation speed and the synchronous rotation speed is made as small as possible before the target gear shift position is established, so that the drive force can more promptly be generated when the driver performs the depressing operation of the accelerator pedal during coasting running with the transmission set to the neutral state.

According to the control device of the vehicle including the multi-speed automatic transmission recited in the third aspect of the invention, the first engagement control portion limits the selected gear shift position so as not to be a gear shift position on the lower speed side than the target gear shift position, and therefore, the input rotation speed can smoothly be raised toward the synchronous rotation speed of the target gear shift position in a short time after the termination of coasting running.

According to the control device of the vehicle including the multi-speed automatic transmission recited in the fourth aspect of the invention, when the actual input rotation speed of the multi-speed automatic transmission is lower than the synchronous rotation speed of the highest-speed gear shift position at the time of return from coasting running due to the depressing operation of the accelerator pedal, the first engagement control portion delays the selection of the gear shift position until the actual input rotation speed of the multi-speed automatic transmission becomes equal to or greater than the synchronous rotation speed of the highest-speed gear shift position. As a result, in the high-speed coasting running with the automatic transmission set to the neutral state, the highest-speed gear shift position is selected after the input rotation speed of the automatic transmission becomes equal to or greater than the synchronous rotation speed of the highest-speed gear shift position, and the engagement force of the engagement element establishing the selected gear shift position is increased.

According to the control device of the vehicle including the multi-speed automatic transmission recited in the fifth aspect of the invention, since the target gear shift position is decided from the shift diagram stored in advance based on the actual vehicle speed and the drive power request amount at the time of return from the coasting running due to the depressing operation of the accelerator pedal, the coasting state with the transmission set to the neutral state is switched to the target gear shift position corresponding to the actual vehicle speed and the drive power request amount, and therefore, the drive force can promptly be generated in accordance with the depressing operation of the accelerator pedal by the driver.

BRIEF DESCRIPTION OF DRAWINGS

FIG. 3 is an operation chart for explaining a relationship between a shift operation of the automatic transmission and a combination of operations of engagement devices used therefor.

MODES FOR CARRYING OUT THE INVENTION

An example of the present invention will now be described in detail with reference to the drawings.

Example

Figure 1:
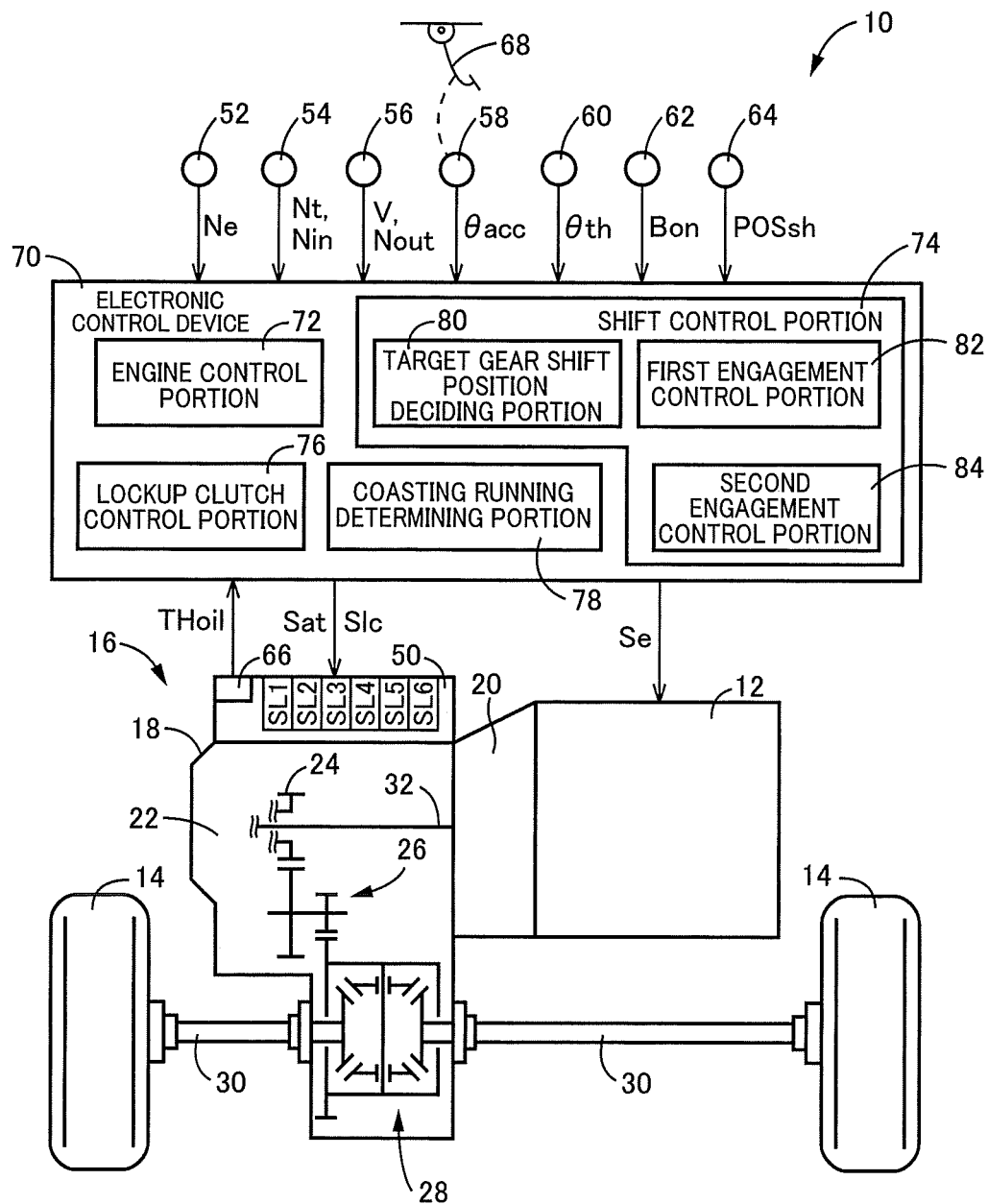
FIG. 1 is a diagram for explaining a general configuration of a vehicle to which the present invention is applied and is a diagram for explaining main portions of a control function of an electronic control device for various controls in the vehicle.

FIG. 1 is a diagram for explaining a general configuration of a vehicle 10 to which the present invention is applied and is a diagram for explaining main portions of a control function of an electronic control device 70 included in the vehicle 10. In FIG. 1, the vehicle 10 includes an engine 12, drive wheels 14, and a power transmission device 16 disposed in a power transmission path between the engine 12 and the drive wheels 14.

The power transmission device 16 includes, in a case 18 acting as a non-rotating member attached to a vehicle body, a torque converter 20, an automatic transmission 22, a reduction gear mechanism 26 coupled to a transmission output gear 24 that is an output rotating member of the automatic transmission 22, a differential gear (differential gear device) 28 coupled to the reduction gear mechanism 26, etc. The power transmission device 16 also includes a pair of drive shafts (axles) 30 etc. coupled to the differential gear 28. In the power transmission device 16, power (synonymous with torque and force if not particularly distinguished) output from the engine 12 is transmitted sequentially through the torque converter 20, the automatic transmission 22, the reduction gear mechanism 26, the differential gear 28, the drive shaft 30, etc. to the drive wheels 14.

The engine 12 is a drive force source of the vehicle 10 and is a known internal combustion engine such as a gasoline engine and a diesel engine. In the engine 12, an engine torque Te is controlled through control of an operational state such as an intake air amount, a fuel injection amount and an ignition timing depending on an operation amount of an accelerator pedal 68 by the electronic control device 70 described later.

Figure 2:
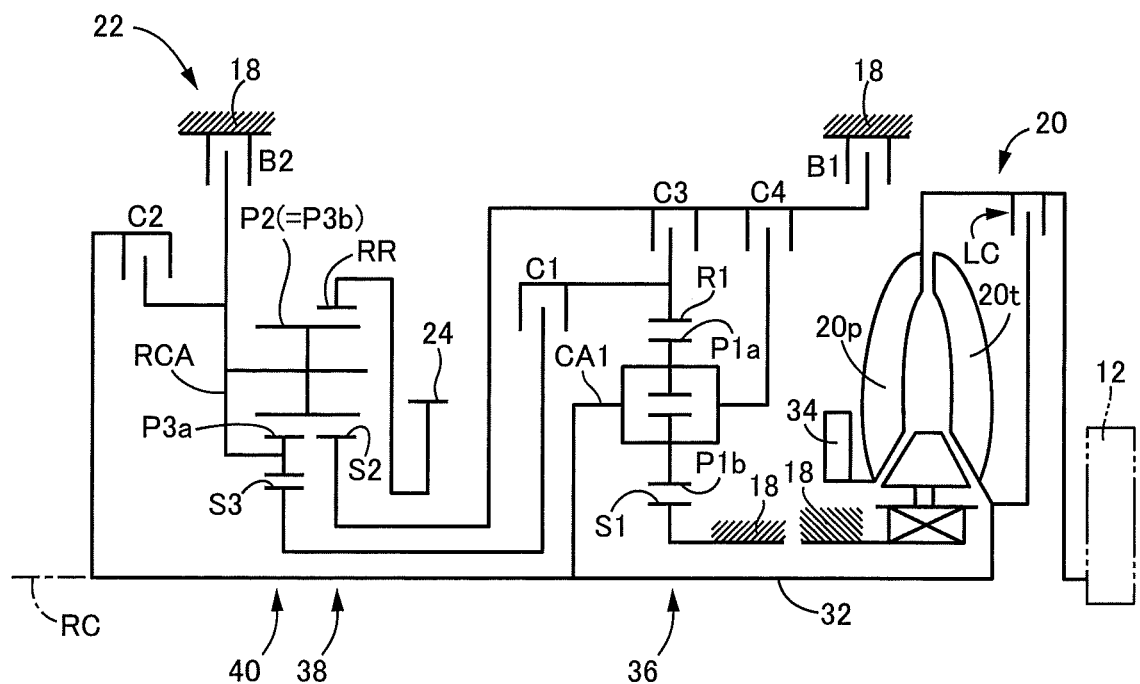
FIG. 2 is a schematic for explaining an example of a torque converter and an automatic transmission.

FIG. 2 is a schematic for explaining an example of the torque converter 20 and the automatic transmission 22. The torque converter 20, the automatic transmission 22, etc. are configured substantially symmetrically with respect to an axial center RC of a transmission input shaft 32 that is an input rotating member of the automatic transmission 22 and have lower halves from the axial center RC not shown in FIG. 2.

In FIG. 2, the torque converter 20 is disposed to rotate around the axial center RC in a power transmission path between the engine 12 and the automatic transmission 22 and is a fluid transmission device including a pump impeller 20p, a turbine impeller 20t, etc. The pump impeller 20p is an input rotating member of the torque converter 20 and is coupled to the engine 12. The turbine impeller 20t is an output rotating member of the torque converter 20 and is coupled to the transmission input shaft 32. The transmission input shaft 32 also serves as a turbine shaft rotationally driven by the turbine impeller 20t. The torque converter 20 also includes a known lockup clutch LC as a direct coupling clutch coupling the pump impeller 20p and the turbine impeller 20t (i.e., coupling the input/output rotating members of the torque converter 20). The power transmission device 16 also includes a mechanical oil pump 34 coupled to the pump impeller 20p.

The oil pump 34 is rotationally driven by the engine 12 to discharge hydraulic fluid used for a shift control of the automatic transmission 22, for a switching control of an operation state of the lockup clutch LC, and for supplying lubrication oil to portions of the power transmission device 16. Therefore, the hydraulic fluid pumped up by the oil pump 34 is supplied as a source pressure of a hydraulic control circuit 50 (see FIG. 1) included in the vehicle 10.

The lockup clutch LC is a hydraulic friction clutch frictionally engaged in accordance with an engagement hydraulic pressure (also referred to as LC hydraulic pressure) supplied from the hydraulic control circuit 50. The operation state of the lockup clutch LC is switched in accordance with the LC hydraulic pressure controlled by the electronic control device 70. The operation state of the lockup clutch LC includes a lockup release state in which the lockup clutch LC is released, a slip state in which the lockup clutch LC is allowed to generate slipping, and a lockup state in which the lockup clutch LC is engaged (locked up).

When the lockup clutch LC is released, the torque converter 20 provides a torque amplifying effect. When the lockup clutch LC is engaged, the pump impeller 20p and the turbine impeller 20t are integrally rotated, and the power of the engine 12 is directly transmitted toward the automatic transmission 22. When the lockup clutch LC is allowed to perform slip operation such that a slip amount Ns (=engine rotation speed Ne−turbine rotation speed Nt; also referred to as a slip rotation amount, a differential rotation speed) in the lockup clutch LC becomes equal to a target slip amount Nst, racing (temporary increase) of the engine rotation speed Ne is suppressed and noise such as booming noise is suppressed at the time of driving (power-on) of the vehicle 10, and on the other hand, at the time of non-driving (power-off) of the vehicle 10, the engine 12 is rotated with the target slip amount Nst relative to the transmission input shaft 32 and, for example, a fuel cut region is expanded.

As shown in FIG. 2, the automatic transmission 22 is a multi-speed type automatic transmission constituting a portion of the power transmission path between the engine 12 and the drive wheels 14. The automatic transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The automatic transmission 22 includes a first clutch C1, a second clutch C2, a third clutch C3, a fourth clutch C4, a first brake B1, and a second brake B2 as a plurality of engagement devices (hereinafter simply referred to as engagement elements CB if not particularly distinguished).

The first planetary gear device 36 includes a first sun gear S1, a plurality of pairs of first planetary gears P1a, P1b meshing with each other, a first carrier CA1 supporting the first planetary gears P1a, P1b such that the first planetary gears P1a, P1b are rotatable about its axis and an axis of the first planetary gear device, and a first ring gear R1 meshing via the first planetary gears P1a, P1b with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of third planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

The engagement elements CB are hydraulic friction engagement devices made up of wet multiplate type clutches and brakes pressed by hydraulic actuators. The engagement elements CB have respective torque capacities (clutch torques) Tc (i.e., clutch torques Tc1, Tc2, Tc3, Tc4, Tb1, Tb2) changed in accordance with hydraulic pressures as engagement pressures (clutch pressures) Pc (i.e., clutch pressures Pc1, Pc2, Pc3, Pc4, Pb1, Pb2) output respectively from solenoid valves SL1 to SL6 etc. in the hydraulic control circuit 50, so that the respective operation states (states such as engagement and release) are switched. To transmit a torque (e.g., an input torque Ti, i.e., a turbine torque Tt, input to the transmission input shaft 32) between the transmission input shaft 32 and the transmission output gear 24 without slipping the engagement elements CB (i.e., without generating a differential rotation speed in the engagement elements CB), each of the engagement elements CB needs to have a torque capacity capable of providing a transmission torque that must be assigned to the engagement element CB (i.e., a shared torque of the engagement element CB) with respect to the torque.

In the automatic transmission 22, the first sun gear S1 is coupled to the case 18. The first carrier CA1 is coupled to the transmission input shaft 32. The first carrier CA1 and the second sun gear S2 are selectively coupled via the fourth clutch C4. The first ring gear R1 and the third sun gear S3 are selectively coupled via the first clutch C1. The first ring gear R1 and the second sun gear S2 are selectively coupled via the third clutch C3. The second sun gear S2 is selectively coupled via the first brake B1 to the case 18. The carrier RCA is selectively coupled via the second clutch C2 to the transmission input shaft 32. The carrier RCA is selectively coupled via the second brake B2 to the case 18. The ring gear RR is coupled to the transmission output gear 24.

The automatic transmission 22 is a multi-speed transmission having a plurality of gear positions (gear shift positions) Gn different in gear ratio (speed change ratio) γ (=input rotation speed Nin of the automatic transmission 22/output rotation speed Nout of the automatic transmission 22), each of the gear positions is established by engaging respective two of the engagement elements CB according to the electronic control device 70 depending on a driver's accelerator operation, a vehicle speed V, etc. For example, as shown in an engagement operation table in FIG. 3, the automatic transmission 22 has gear positions Gn of eight forward gear positions from a first speed gear position "1st" to an eighth speed gear position "8th" and a reverse gear position "Rev" such that the gear positions Gn are selectively established. The input rotation speed Nin is a rotation speed of the transmission input shaft 32 and the output rotation speed Nout is a rotation speed of the transmission output gear 24. The gear ratio γ of the automatic transmission 22 corresponding to each of the gear positions Gn is appropriately defined by gear ratios (=the number of teeth of the sun gear/the number of teeth of the ring gear) ρ1, ρ2, and ρ3 of the first planetary gear device 36, the second planetary gear device 38, and the third planetary gear device 40. The gear ratio γ is the highest at the first speed gear position "1st" and decreases toward the higher vehicle speed side (the eighth speed gear position "8th" side).

The engagement operation table of FIG. 3 represents the relationship between the gear positions established in the automatic transmission 22 and the operation states of the engagement elements CB, and "O" and a blank indicate engagement and release of the engagement elements CB, respectively. In FIG. 3, each gear shift position Gn is established by engagement of two engagement elements CB. For example, among the forward gear positions, the first speed gear position "1st" is established by engagement of the first clutch C1 and the second brake B2. The second speed gear position "2nd" is established by engagement of the first clutch C1 and the first brake B1. The third speed gear position "3rd" is established by engagement of the first clutch C1 and the third clutch C3. The fourth speed gear position "4th" is established by engagement of the first clutch C1 and the fourth clutch C4. The fifth speed gear position "5th" is established by engagement of the first clutch C1 and the second clutch C2. The sixth speed gear position "6th" is established by engagement of the second clutch C2 and the fourth clutch C4. The seventh speed gear position "7th" is established by engagement of the second clutch C2 and the third clutch C3. The eighth speed gear position "8th" is established by engagement of the second clutch C2 and the first brake B1. The reverse gear position "Rev" is established by engagement of the third clutch C3 and the second brake B2. When none or only one of the engagement elements CB is engaged, the automatic transmission 22 is brought into a neutral state in which no gear position is established (i.e., a neutral state in which power transmission is interrupted). Therefore, by releasing any one of the engagement elements CB in the engaged state in each of the gear positions Gn, the automatic transmission 20 can be brought into the neutral state.

Returning to FIG. 1, the vehicle 10 includes the electronic control device 70 as a controller including a control device of the vehicle 10 related to control of the engagement elements CB, for example. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. The electronic control device 70 is configured separately for the engine control, the hydraulic control, etc., as needed.

The electronic control device 70 is supplied with various signals based on detection values from various sensors etc. disposed in the vehicle 10. The various sensors include, for example, an engine rotation speed sensor 52, an input rotation speed sensor 54, an output rotation speed sensor 56, an accelerator opening degree sensor 58, a throttle valve opening degree sensor 60, a brake switch 62, a shift position sensor 64, and an oil temperature sensor 66). The various signals include, for example, the engine rotation speed Ne, the input rotation speed Nin that is also the rotation speed of the turbine shaft (i.e., the turbine rotation speed Nt), the output rotation speed Nout corresponding to the vehicle speed V, an accelerator opening degree θacc that is the operation amount of the accelerator pedal 68, a throttle valve opening degree θth that is an opening degree of an electronic throttle valve, a brake-on signal Bon indicative of a brake operation state when the driver operates a brake operation member for operating a wheel brake, a shift-lever operation position (shift position) POSsh such as "P" (parking position), "R" (reverse running position), "N" (neutral position), and "D" (forward running position), and a hydraulic fluid temperature THoil that is a temperature of hydraulic fluid in the hydraulic control circuit 50.

The electronic control device 70 outputs to respective devices (e.g., the engine 12 and the hydraulic control circuit 50) included in the vehicle 10 various command signals, for example, an engine control command signal Se for controlling the engine 12, a hydraulic control command signal Sat for controlling the operation state of the engagement elements CB, and a hydraulic control command signal Slc for controlling the operation state of the lockup clutch LC. This hydraulic control command signal Sat is a command signal for driving each of the solenoid valves SL1 to SL6 etc. regulating the clutch pressures Pc supplied to the respective hydraulic actuators of the engagement elements CB (i.e. a drive current according to an instruction pressure corresponding to each of the set clutch pressures Pc) and is output to the hydraulic control circuit 50. The hydraulic control command signal Slc is a command signal for driving a solenoid valve etc. regulating the LC hydraulic pressure, for example, and is output to the hydraulic control circuit 50.

To implement the control function for various controls in the vehicle 10, the electronic control device 70 includes an engine control means, i.e., an engine control portion 72, a shift control means, i.e., a shift control portion 74, and a lockup clutch control means, i.e., a lockup clutch control portion 76.

The engine control portion 72 controls the engine 12 such that the requested engine torque Te is acquired. For example, the engine control portion 72 applies the accelerator opening degree θacc and the vehicle speed V (synonymous with the output rotation speed Nout of the automatic transmission 22 etc.) to a relationship (e.g., a drive force map) obtained empirically or through design and stored in advance (i.e. predefined) and thereby calculates a required drive torque Tdem as a drive power request amount Md. The engine control portion 72 sets a target engine torque Tetgt for achieving the required drive torque Tdem in consideration of the gear position Gn of the automatic transmission 22 and outputs the engine control command signal Se for controlling the engine 12 to a throttle actuator, a fuel injection device, an ignition device, etc. such that the target engine torque Tetgt is acquired.

A required drive force Fdem (N) of the drive wheels 14, a required drive power Pdem (W) of the drive wheels 14, a required transmission output torque Todem of the automatic transmission 22, etc. can be used as the drive request amount Md instead of the required drive torque Tdem (Nm) of the drive wheels 14. The accelerator opening degree θacc (%), the throttle valve opening degree θth (%), etc. can also simply be used as the drive request amount Md.

The shift control portion 74 provides the shift control of the automatic transmission 22. For example, the shift control portion 74 applies the actual vehicle speed V (synonymous with the output rotation speed Nout of the automatic transmission 22 etc.) and the accelerator opening degree θacc (synonymous with the required drive force Fdem or the required drive torque Tdem, the throttle valve opening degree θth, etc.) to a predefined relationship exemplarily illustrated by, for example, a shift map of FIG. 4, to determine the shift of the automatic transmission 22 (i.e., determine the gear position Gn to be established in the automatic transmission 22). The shift control portion 74 outputs the hydraulic control command signal Sat to the hydraulic control circuit 50 as a shift command for switching the operation state of the engagement elements CB so that the determined gear position Gn is established.

At the time of the shift of the automatic transmission 22, the shift control portion 74 performs a so-called clutch-to-clutch shift in which engaged engagement element out of the engagement elements CB involved in the shift of the automatic transmission 22 is changed (i.e., switching the engagement and release of the engagement elements involved in the shift). For example, in the 5-to-6 upshift from the fifth speed gear position "5th" to the sixth speed gear position "6th", a change in engagement is made between the first clutch C1 and the fourth clutch C4 (i.e., the clutch-to-clutch shift is performed by releasing the first clutch C1 and engaging the fourth clutch C4).

The lockup clutch control portion 76 controls the operation state of the lockup clutch LC. For example, the lockup clutch control portion 76 applies the vehicle speed V (synonymous with the output rotation speed Nout of the automatic transmission 22 etc.) and the accelerator opening degree θacc (synonymous with the required drive torque Tdem, the throttle valve opening degree θth, etc.) to a predefined relationship (e.g., a lockup region diagram) having a lockup-off region, a slip operation region, and a lockup region to determine a current region and outputs to the hydraulic control circuit 50 the hydraulic control command signal Slc for supplying the lockup clutch LC with the LC hydraulic pressure for achieving the operation state corresponding to the determined region.

For example, while an economy mode is set and the shift lever is operated to a D range position without a brake operation, a coasting running determining portion 78 determines that a coasting running start condition is satisfied for coasting running using inertia with the automatic transmission 22 set to the neutral state if the accelerator opening degree θacc defined as the operation amount of the accelerator pedal 68 or the throttle valve opening degree θth defined as the opening degree of the electronic throttle valve is set to zero (%), and determines that a coasting running termination condition is satisfied if the accelerator opening degree θacc or the throttle valve opening degree θth is increased from zero (%) for re-acceleration, for example.

When the coasting running determining portion 78 determines that the coasting running start condition is satisfied, the shift control portion 74 brings the automatic transmission 22 into the neutral state and releases the power transmission path from the engine 12 to the transmission output gear 24 to cause the vehicle 10 to perform coasting running. When the coasting running determining portion 78 determines that the coasting running termination condition is satisfied as in the case that the driver performs a depressing operation of the accelerator pedal 68 during coasting running, the shift control portion 74 establishes an appropriate gear shift position out of the gear shift positions of the automatic transmission 22 to promptly generate a drive force.

Therefore, the shift control portion 74 includes a target gear shift position deciding portion 80, a first engagement control portion 82, and a second engagement control portion 84. The target gear shift position deciding portion 80 decides a target gear shift position Gm from, for example, a shift diagram stored in advance shown in FIG. 4, based on the actual vehicle speed V and the accelerator opening degree θacc when the coasting running determining portion 78 determines that the coasting running termination condition is satisfied.

At the time of return from coasting running to normal running of the vehicle 10 due to a depressing operation of the accelerator pedal 68, the first engagement control portion 82 selects as a selected gear shift position Gs the gear shift position on the lowermost speed side out of the gear shift positions Gn having a synchronous rotation speed Nd lower than the actual input rotation speed Nin of the multi-speed automatic transmission 22 at the time of determination of the end of coasting running and increases an engagement force of an engagement element Cgs for establishing the selected gear shift position Gs. As a result, even if the input rotation speed Nin of the automatic transmission 22 is significantly different from a synchronous rotation speed Ndm of the target gear shift position Gm, the drive force can immediately be raised after return from coasting running. The synchronous rotation speed Nd of each of the gear shift positions Gn of the automatic transmission 22 is the rotation speed of the input shaft 32 (=γ*the output rotation speed Nout) determined by the respective speed change ratios γ when the gear shift positions Gn are established. The selected gear shift position Gs is preferably a gear shift position between a highest-speed gear shift position Gmax and the target gear shift position Gm decided by the target gear shift position deciding portion 80 and is limited so as not to be a gear shift position on the lower speed side than the target gear shift position Gm.

If the input rotation speed Nin of the automatic transmission 22 is lower than a synchronous rotation speed Ndmin of the highest-speed gear shift position Gmax (e.g., the eighth speed gear position) at the time of return from coasting running due to the depressing operation of the accelerator pedal 68, the first engagement control portion 82 delays the selection of the gear shift position of the automatic transmission 22 until the input rotation speed Nin of the automatic transmission 22 becomes equal to or greater than the synchronous rotation speed Ndmin of the highest-speed gear shift position Gmax. As a result, in high-speed coasting running of the vehicle 10 in which the automatic transmission 22 is set to the neutral state, the highest-speed gear shift position Gmax is selected as the selected gear shift position Gs after the input rotation speed Nin of the automatic transmission 22 becomes equal to or greater than the synchronous rotation speed Ndmin of the highest-speed gear shift position Gmax, and an engagement force of an engagement element Cgmax (the brake B1) establishing the selected highest-speed gear shift position Gmax is increased.

When the actual input rotation speed Nin of the automatic transmission 22 reaches a determination rotation speed Nj (e.g., the synchronous rotation speed Ndm of the target gear shift position Gm–a predetermined value α) set for determination of attainment to the synchronous rotation speed Ndm of the target gear shift position Gm decided by the target gear shift position deciding portion 80, the second engagement control portion 84 engages an engagement element Cgm establishing the target gear shift position Gm.

Figure 4:
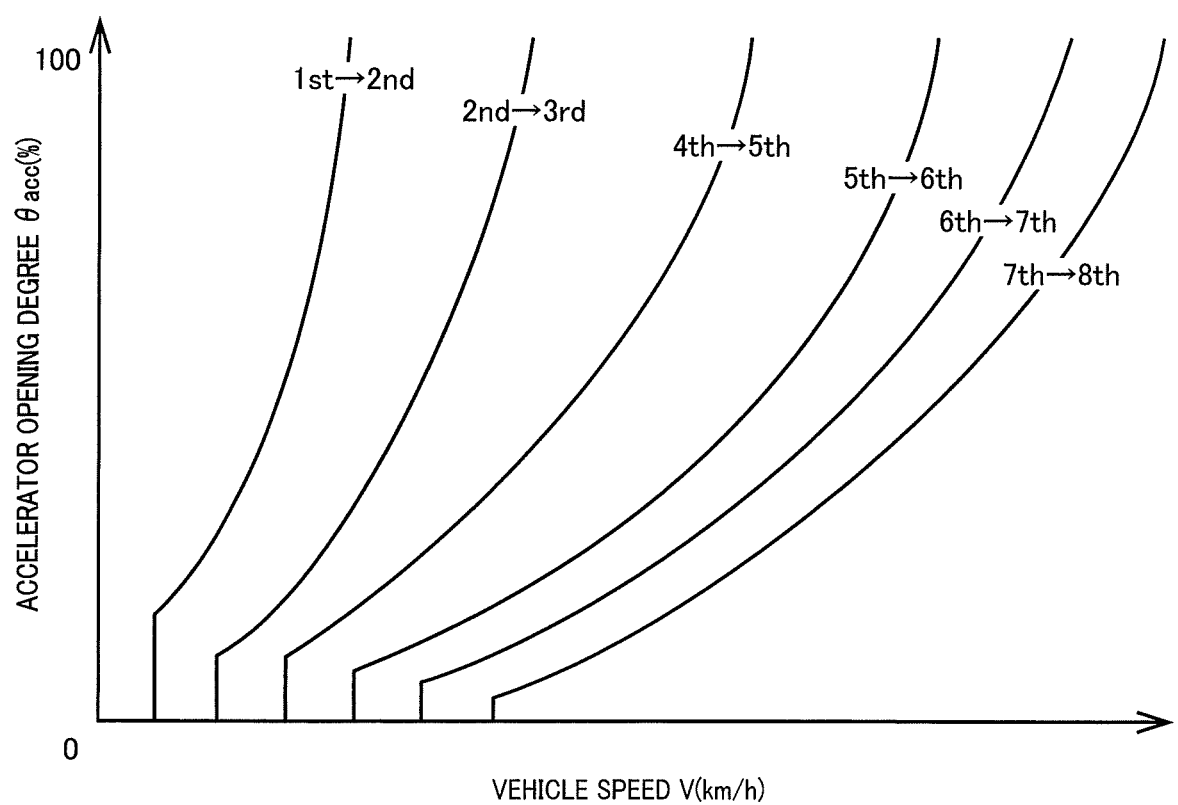
FIG. 4 is an example of a shift diagram used for switching gear shift positions of an automatic transmission of FIG. 1.
Figure 5:
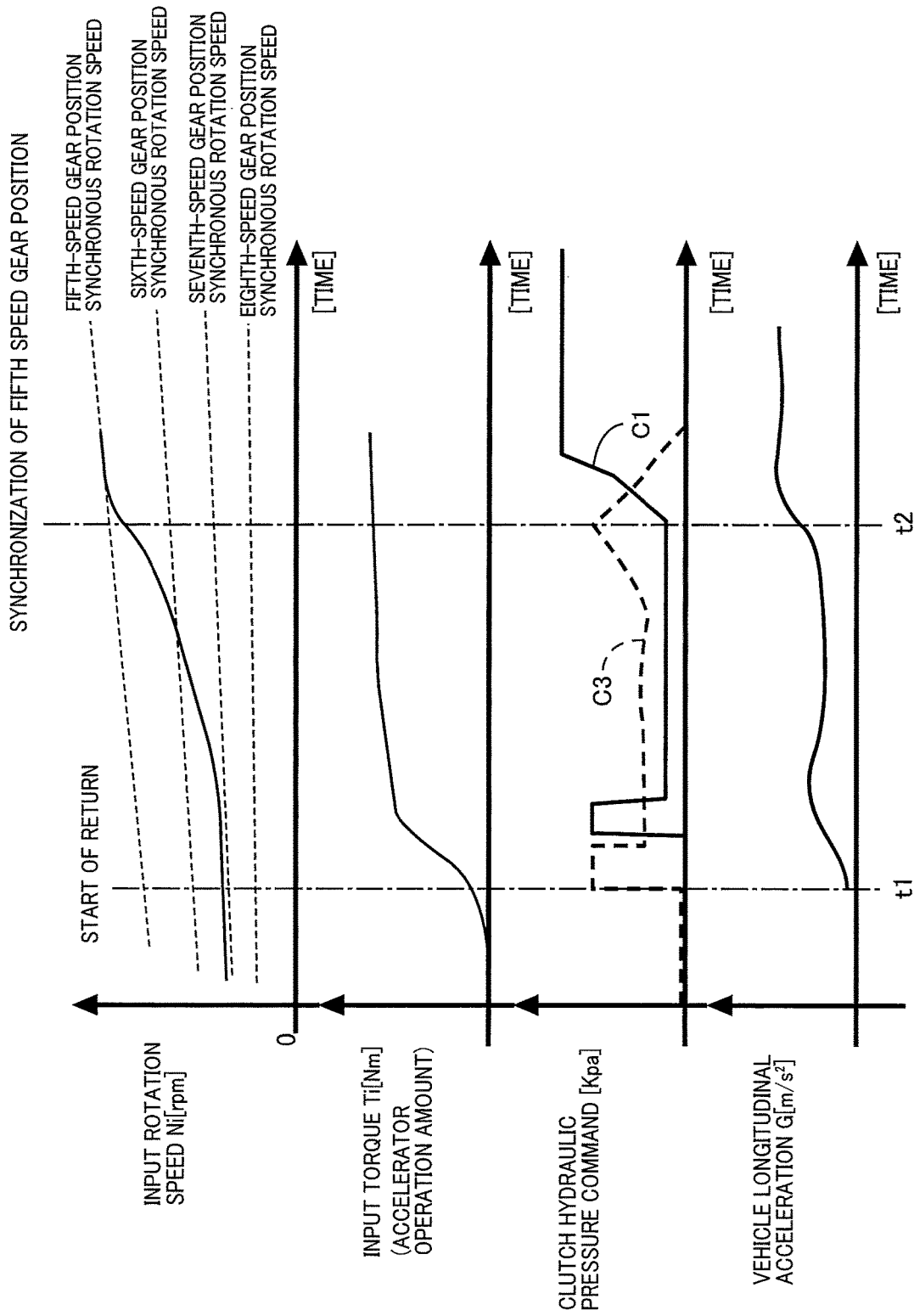
FIG. 5 is a time chart for explaining a main portion of a control operation of the electronic control device of FIG. 1.

For example, when coasting running is performed since the clutch C3 is released although the clutch C2 is engaged where the clutches C2 and C3 are to be engaged in the seventh speed gear position, and as shown at time point t1 of FIG. 5, it is determined that the coasting running termination condition is satisfied due to the depressing operation of the accelerator pedal 68 by the driver during the coasting running, first, the target gear shift position deciding portion 80 decides the fifth speed gear position as the target gear shift position Gm based on the shift diagram stored in advance shown in FIG. 4 and values of the actual vehicle speed V and the accelerator opening degree θacc at this time point. At the time point t1, to immediately acquire the drive force in response to the depressing operation of the accelerator pedal 68, a hydraulic pressure command signal for achieving partial engagement of the engagement element Cgs (clutch C3) for establishing the selected gear shift position Gs, for example, the seventh speed gear position, is output as indicated by a broken line, and when the input rotation speed Nin reaches the synchronous rotation speed Ndm of the target gear shift position Gm, a hydraulic pressure command signal for engaging the engagement element Cgm (clutch C1) is output as indicated by a solid line so as to establish the target gear shift position Gm (fifth speed gear position). Since the input rotation speed Nin is greater than a synchronous rotation speed Nds of the selected gear shift position Gs (seventh speed gear position) at the time point t1, the engagement force of the engagement element Cgs (clutch C3) establishing the selected gear shift position Gs (seventh speed gear position) is made higher to control a raise in the input rotation speed Nin while immediately ensuring the drive force.

Specifically, as shown in FIG. 5, the first engagement control portion 82 selects as the selected gear shift position Gs the seventh speed gear position that is the gear shift position on the lowermost speed side out of the gear shift positions Gn having a synchronous rotation speed Nd lower than the actual input rotation speed Nin of the automatic transmission 22 and increases the friction engagement force of the engagement element Cgs (clutch C3) for establishing the selected gear shift position Gs (seventh speed gear position) to immediately raise the drive force of the vehicle 10. Subsequently, as indicated at time point t2 of FIG. 5, when the actual input rotation speed Nin of the automatic transmission 22 reaches the determination rotation speed Nj set for determination of attainment to the synchronous rotation speed Ndm of the target gear shift position Gm, the second engagement control portion 84 releases the engagement element Cgs (clutch C3) having the engagement force transiently increased to acquire the drive force and engages the engagement element Cgm (clutch C1) establishing the target gear shift position Gm. Since the engagement state of a remaining engagement element Cg (clutch C2) which has been engaged is continued, the target gear shift position Gm (fifth speed gear position) is established by engagement of the engagement element Cgm (clutch C1) and the remaining engagement element Cg (clutch C2). The drive force is immediately acquired as indicated by a value of a longitudinal acceleration G (m/s$^2$) of the vehicle 10 in FIG. 5 from the time point t1 when the return from coasting running is started until the time point t2 when the target gear shift position Gm is established, even if the input rotation speed Nin of the automatic transmission 22 is significantly different from the synchronous rotation speed Ndm of the target gear shift position Gm after the return from coasting running.

Figure 7:
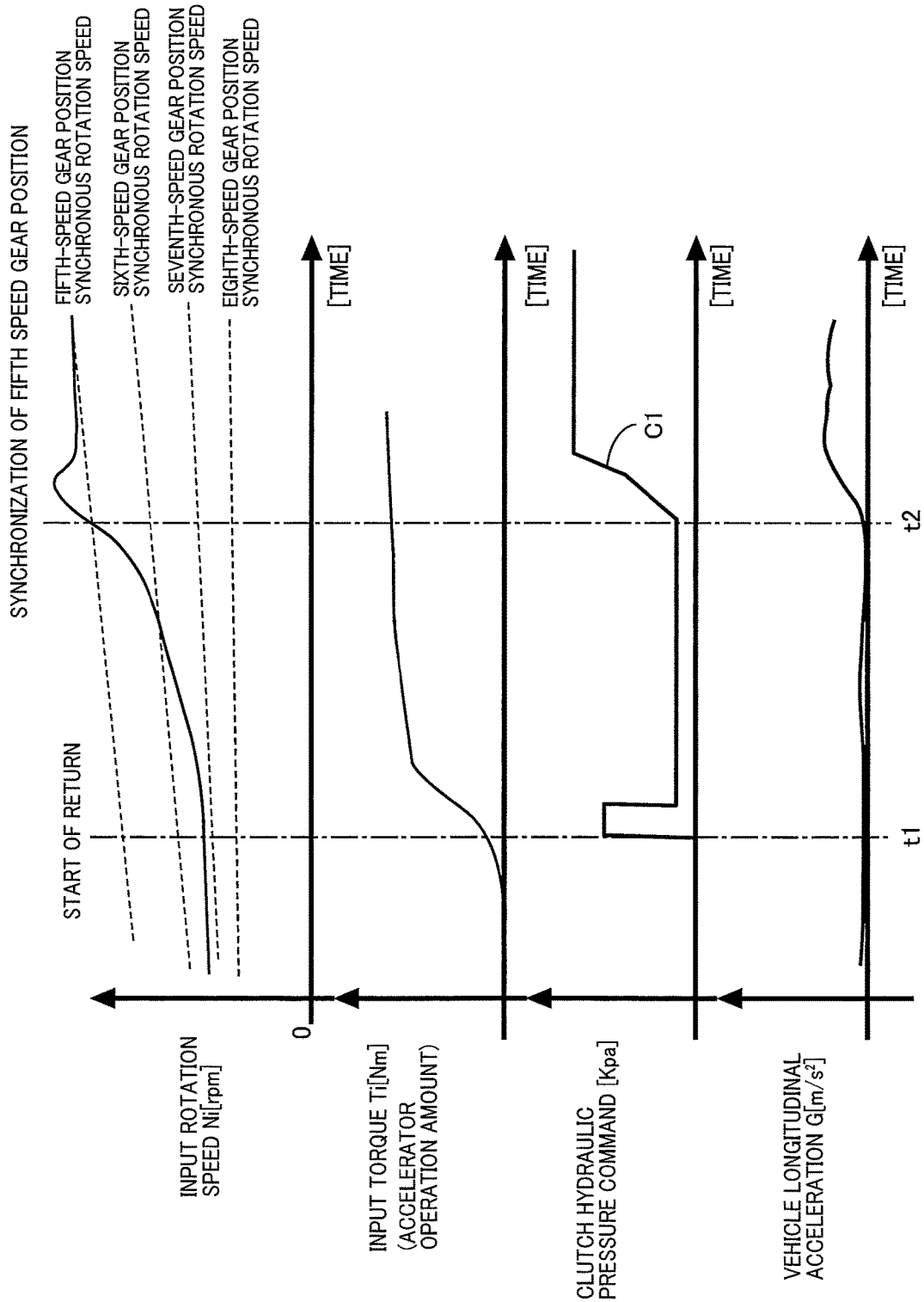
FIG. 7 is a time chart for explaining a main portion of a control operation of a conventional electronic control device.

For comparison, in conventional control at the time of return from coasting running particularly when the first engagement control portion 82 is not included, as shown in a time chart of FIG. 7, no drive force is generated by engagement of the engagement element Cgs for establishing the selected gear shift position Gs having the synchronous rotation speed Nd lower than the input rotation speed Nin at the time point t1 of the return from coasting running, and therefore, the longitudinal acceleration G (m/s$^2$) of the vehicle 10 is substantially zero from the time point t1 when the return from coasting running is started until the time point t2 when the target gear shift position Gm is established, so that the drive force is not immediately acquired.

Figure 6:
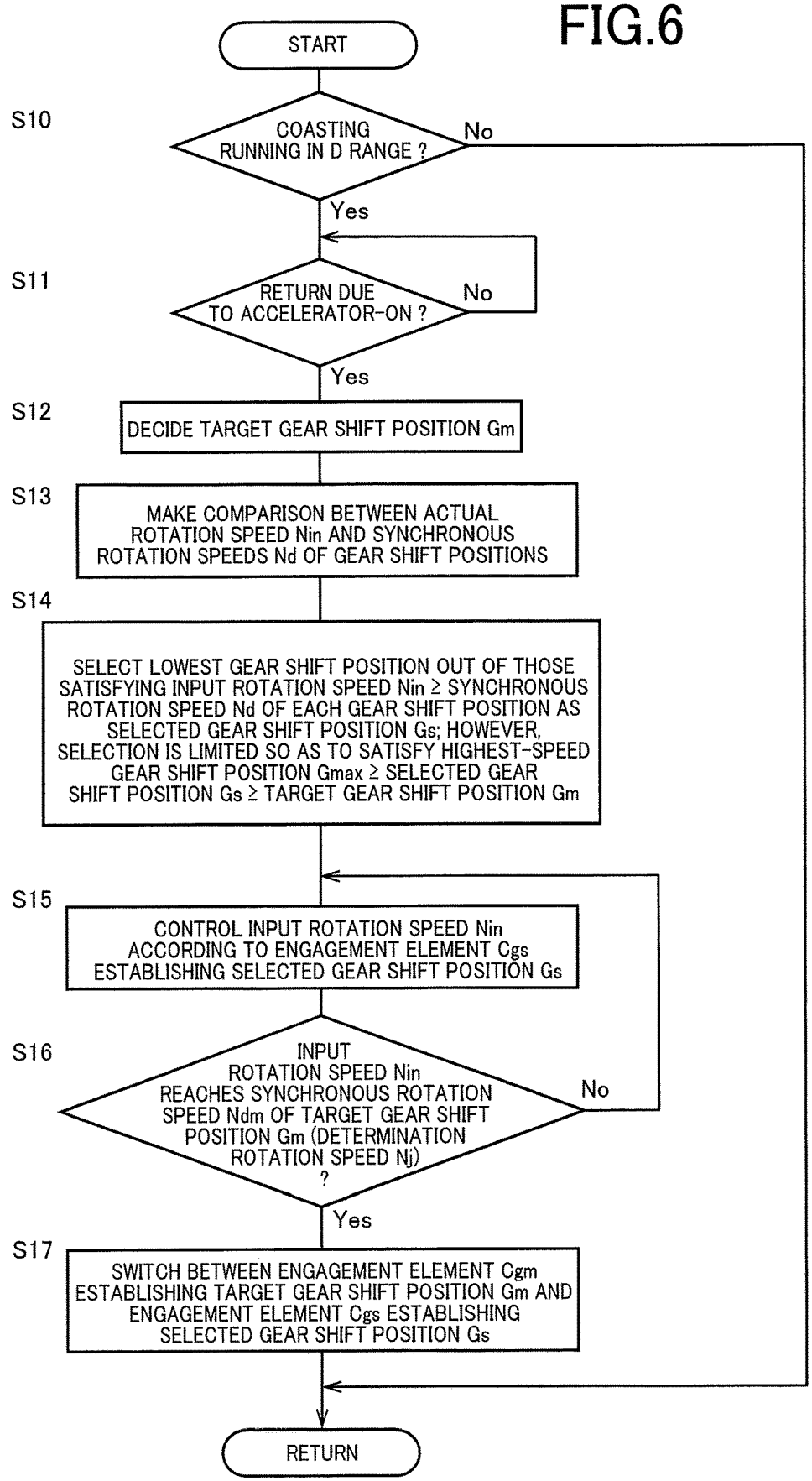
FIG. 6 is a flowchart for explaining a main portion of the control operation of the electronic control device of FIG. 1.

FIG. 6 is a flowchart for explaining a main portion of the control operation of the electronic control device 70, i.e., the main portion of the control operation for immediately acquiring the drive force at the time of return from coasting running.

In FIG. 6, at step S10 (hereinafter, step is omitted) corresponding to the coasting running determining portion 78, it is determined whether coasting running is being performed in the D range, based on, for example, at least one of the facts that the accelerator opening degree θacc from the accelerator opening degree sensor 58 is zero (%), that the brake-on signal Bon from the brake switch 62 is in the off state, that the shift-lever operation position POSsh from the shift position sensor 64 is "D", etc.

If the determination of S10 is negative, this routine is terminated, and if the determination of S10 is affirmative, it is determined at S11 corresponding to the coasting running determining portion 78 whether the termination condition of coasting running in the D range is satisfied, for example, whether the accelerator pedal 68 is depressed to turn on the accelerator pedal, based on the signal indicative of the accelerator opening degree θacc from the accelerator opening degree sensor 58. If the determination of S11 is negative, S11 is repeatedly executed, and if the determination of S11 is affirmative, S12 corresponding to the target gear shift position determining portion 80 is executed.

At S12, the target gear shift position Gm is decided from, for example, the shift diagram stored in advance shown in FIG. 4, based on the actual vehicle speed V and the accelerator opening degree θacc when the coasting running determining portion 78 determines that the coasting running termination condition is satisfied. In the case shown in the time chart of FIG. 5, for example, the fifth speed gear position is determined as the target gear shift position Gm. Subsequently, S13 to S16 corresponding to the first engagement control portion 82 are executed.

At S13, a comparison is made between the actual input rotation speed Nin when it is determined that the coasting running termination condition is satisfied and the synchronous rotation speeds Nd of the gear shift positions Gn of the automatic transmission 22, and at S14, the gear shift position on the lowermost speed side is selected as the selected gear shift position Gs out of the gear shift positions Gn having the synchronous rotation speed Nd lower than the actual input rotation speed Nin. In the case shown in the time chart of FIG. 5, the seventh speed gear position is selected as the selected gear shift position Gs out of the seventh and eighth speed gear positions, which are the gear shift positions having the synchronous rotation speed Nd lower than the actual input rotation speed Nin. In this case, preferably, the condition is that the selected gear shift position Gs is a gear shift position (e.g., the seventh speed gear position) between the highest-speed gear shift position Gmax (e.g., the eighth speed gear position) and the target gear shift position Gm (e.g., the fifth speed gear position).

Next, at S15, until it is determined at S16 that the input rotation speed Nin reaches the determination rotation speed Nj set for determination of attainment to the synchronous rotation speed Ndm of the target gear shift position Gm (e.g., the fifth speed gear position), an adjustment is made to the engagement force of the engagement elements Cgs establishing the selected gear shift position Gs (e.g., the seventh speed gear position), i.e., the clutches C2 and C3, or substantially to the engagement force of the clutch C3 since the clutch C2 is completely engaged, so as to immediately increase the drive force of the vehicle 10, and the input rotation speed Nin is changed toward the synchronous rotation speed Ndm of the target gear shift position Gm (e.g., the fifth speed gear position). Therefore, the engagement element Cgs establishing the selected gear shift position Gs is a rotation control clutch controlling the input rotation speed Nin. From the above, at S16, a control of the input rotation speed Nin is provided by the engagement element (the rotation control clutch) Cgs establishing the selected gear shift position Gs.

If it is determined at S16 that the input rotation speed Nin reaches the determination rotation speed Nj set for determination of attainment to the synchronous rotation speed Ndm of the target gear shift position Gm (the fifth speed gear position), at S17 corresponding to the second engagement control portion 84, the engagement element Cgm establishing the target gear shift position Gm, for example, the clutch C1, is engaged, and the engagement element Cgs establishing the selected gear shift position Gs (which is also the rotation control clutch controlling the input rotation speed Nin), for example, the clutch C3, is released, so as to establish the target gear shift position Gm. As a result, this control routine is terminated.

As described above, according to the electronic control device 70 of the vehicle 10 including the automatic transmission 22 of this example, at the time of return from coasting running to normal running of the vehicle 10 due to a depressing operation of the accelerator pedal 68, the first engagement control portion 82 selects the selected gear shift position Gs having the synchronous rotation speed Nd lower than the actual input rotation speed Nin of the automatic transmission 22 and increases the engagement force of the engagement element Cgs establishing the selected gear shift position Gs to immediately increase the drive force of the vehicle 10, and subsequently, when the actual input rotation speed Nin of the automatic transmission 22 reaches the determination rotation speed Nj set for determination of attainment to the synchronous rotation speed Ndm of the target gear shift position Gm, the second engagement control portion 84 engages the engagement element Cgm establishing the target gear shift position Gm.

As a result, the engagement force of the engagement element Cgs establishing the selected gear shift position Gs is increased so that the drive force of the vehicle 10 is immediately increased to reduce a difference between the input rotation speed Nin of the automatic transmission 22 and the synchronous rotation speed Ndm of the target gear shift position Gm before the target gear shift position Gm is established, and therefore, in the case that the driver performs the depressing operation of the accelerator pedal 68 during coasting running with the automatic transmission 22 set to the neutral state, the drive force can promptly be generated while raising the input rotation speed Nin.

According to the electronic control device 70 of this example, at the time of return from the coasting running due to the depressing operation of the accelerator pedal 68, the first engagement control portion 82 selects as the selected gear shift position Gs the gear shift position on the lowermost speed side out of the gear shift positions Gn having the synchronous rotation speed Nd lower than the actual input rotation speed Nin of the automatic transmission 22. As a result, even if the input rotation speed Nin of the automatic transmission 22 is significantly different from the synchronous rotation speed Ndm of the target gear shift position Gm, the drive force of the vehicle 10 is immediately increased by increasing the engagement force of the engagement element Cgs establishing the gear shift position on the lowermost speed side defined as the selected gear shift position Gs, and the difference between the input rotation speed Nin and the synchronous rotation speed Ndm is made as small as possible before the target gear shift position Gm is established, so that the drive force can more promptly be generated when the driver performs the depressing operation of the accelerator pedal 68 during coasting running with the automatic transmission 22 set to the neutral state.

According to the electronic control device 70 of this example, the selected gear shift position Gs is limited by the first engagement control portion 82 so as not to be a gear shift position on the lower speed side than the target gear shift position Gm, and therefore, the input rotation speed Nin can smoothly be raised toward the synchronous rotation speed Ndm of the target gear shift position Gm in a short time after the termination of coasting running.

According to the electronic control device 70 of this example, if the input rotation speed Nin of the automatic transmission 22 is lower than the synchronous rotation speed Ndmin of the highest-speed gear shift position Gmax at the time of return from coasting running due to the depressing operation of the accelerator pedal 68, the first engagement control portion 82 delays the selection of the gear shift position of the automatic transmission 22 until the input rotation speed Nin of the automatic transmission 22 becomes equal to or greater than the synchronous rotation speed Ndmin of the highest-speed gear shift position Gmax. As a result, in the high-speed coasting running with the automatic transmission 22 set to the neutral state, the highest-speed gear shift position Gmax is selected as the selected gear shift position Gs after the input rotation speed Nin of the automatic transmission 22 becomes equal to or greater than the synchronous rotation speed Ndmin of the highest-speed gear shift position Gmax, and the engagement force of the engagement element Cgmax establishing the selected highest-speed gear shift position Gmax of the engagement elements CB is increased.

According to the electronic control device 70 of this example, since the target gear shift position Gm is decided from the shift diagram stored in advance based on the actual vehicle speed V and the drive request amount Md at the time of return from the coasting running due to the depressing operation of the accelerator pedal 68, the coasting state with the automatic transmission 22 set to the neutral state is switched to the target gear shift position Gm corresponding to the actual vehicle speed V and the drive request amount Md (in this example, the accelerator opening degree θacc), and therefore, the drive force can promptly be generated in accordance with the depressing operation of the accelerator pedal 68 by the driver.

Although the example of the present invention has been described in detail with reference to the drawings, the present invention can be also applied in other forms.

For example, although the electronic control device 70 (the first engagement control portion 82 of the shift control portion 74) selects as the selected gear shift position Gs the seventh speed gear position that is the gear shift position on the lowermost speed side out of the gear shift positions (the seventh speed gear position and the eighth speed gear position) having the synchronous rotation speed Nd lower than the input rotation speed Nin in the example described above, the selected gear shift position Gs may not necessarily be the gear shift position on the lowermost speed side, and even if the eighth speed gear position is selected as the selected gear shift position Gs, a certain effect can be acquired in terms of immediate acquisition of the drive force.

Although the gear shift positions Gn are switched in accordance with a combination of engagement of two engagement elements in the automatic transmission 22 of the example described above, the gear shift positions Gn may be switched in accordance with a combination of engagement of three engagement elements.

Although the automatic transmission 22 has the gear positions Gn of the eight forward speeds in the example described above, the present invention is not limited to this form. The automatic transmission 22 may be a multi-speed transmission having a plurality of the gear positions Gn selectively established by selectively engaging any of a plurality of engagement elements. Although each of the gear positions Gn is established by engaging two engagement elements in the example described above, each of the gear positions Gn may be established by engagement of a plurality of engagement elements, and the automatic transmission 20 may be brought into the neutral state by releasing any one engagement element out of a plurality of the engagement elements CB in the engaged state in each of the gear positions Gn.

Although the engine 12 is exemplified as the drive force source of the vehicle 10 in the example described above, the present invention is not limited to this form. For example, another motor such as an electric motor may be employed in combination with the engine 12, as the drive force source. Although the torque converter 20 is exemplified as the fluid transmission device, the present invention is not limited to this form. For example, another fluid transmission device such as a fluid coupling without a torque amplification effect may be used instead of the torque converter 20.

The above description is merely an embodiment and the present invention can be implemented in variously modified and improved forms based on the knowledge of those skilled in the art.

REFERENCE SIGNS LIST

10: vehicle
22: automatic transmission (multi-speed automatic transmission)
68: accelerator pedal
70: electronic control device (control device)
82: first engagement control portion
84: second engagement control portion
CB: engagement elements
Cgm: engagement element establishing a target gear shift position
Cgs: engagement element establishing a selected gear shift position
Cgmax: engagement element establishing a highest-speed gear shift position
Gn: gear position (gear shift position)
Gm: target gear shift position
Gmax: highest-speed gear shift position
Gs: selected gear shift position
Md: drive power request amount
Nd: synchronous rotation speed
Ndm: synchronous rotation speed of the target gear shift position
Ndmin: synchronous rotation speed of the highest-speed gear shift position
Nin: actual input rotation speed
Nj: determination rotation speed

What is claimed is:

1. A control device of a vehicle including a multi-speed automatic transmission applied to a vehicle including a multi-speed automatic transmission including a plurality of engagement elements and establishing each of a plurality of gear shift positions by changing a combination of a predetermined number of engagement elements out of the plurality of engagement elements, the control device bringing the multi-speed automatic transmission into a neutral state by releasing one of the predetermined number of engagement elements in coasting running according to a releasing operation of an accelerator pedal and establishing a target gear shift position corresponding to a vehicle running state so that the vehicle is returned from the coasting running when a depressing operation of the accelerator pedal is made to return from the coasting running, the control device comprising:

a first engagement control portion selecting a selected gear shift position having a synchronous rotation speed lower than an actual input rotation speed of the multi-speed automatic transmission at the time of return from the coasting running due to the depressing operation of the accelerator pedal and increasing an engagement force of an engagement element establishing the selected gear shift position to immediately increase a drive force of the vehicle; and a second engagement control portion engaging the engagement element establishing the target gear shift position when the actual input rotation speed of the multi-speed automatic transmission reaches a determination rotation speed set for determination of attainment to the synchronous rotation speed of the target gear shift position.

2. The control device of a vehicle including a multi-speed automatic transmission according to claim 1, wherein
the first engagement control portion sets as the selected gear shift position a gear shift position on a lowermost speed side out of the gear shift positions each having a synchronous rotation speed lower than the actual input rotation speed of the multi-speed automatic transmission.

3. The control device of a vehicle including a multi-speed automatic transmission according to claim 1, wherein
the first engagement control portion limits the selected gear shift position so as not to be a gear shift position on the lower speed side than the target gear shift position.

4. The control device of a vehicle including a multi-speed automatic transmission according to claim 2, wherein
the first engagement control portion limits the selected gear shift position so as not to be a gear shift position on the lower speed side than the target gear shift position.

5. The control device of a vehicle including a multi-speed automatic transmission according to claim 1, wherein
when the actual input rotation speed of the multi-speed automatic transmission is lower than a synchronous rotation speed of a highest-speed gear shift position at the time of return from coasting running due to the depressing operation of the accelerator pedal, the first engagement control portion delays selection of the selected gear shift position until the actual input rotation speed of the multi-speed automatic transmission becomes equal to or greater than the synchronous rotation speed of the highest-speed gear shift position.

6. The control device of a vehicle including a multi-speed automatic transmission according to claim 2, wherein
when the actual input rotation speed of the multi-speed automatic transmission is lower than a synchronous rotation speed of a highest-speed gear shift position at the time of return from coasting running due to the depressing operation of the accelerator pedal, the first engagement control portion delays selection of the selected gear shift position until the actual input rotation speed of the multi-speed automatic transmission becomes equal to or greater than the synchronous rotation speed of the highest-speed gear shift position.

7. The control device of a vehicle including a multi-speed automatic transmission according to claim 3, wherein
when the actual input rotation speed of the multi-speed automatic transmission is lower than a synchronous rotation speed of a highest-speed gear shift position at the time of return from coasting running due to the depressing operation of the accelerator pedal, the first engagement control portion delays selection of the selected gear shift position until the actual input rotation speed of the multi-speed automatic transmission becomes equal to or greater than the synchronous rotation speed of the highest-speed gear shift position.

8. The control device of a vehicle including a multi-speed automatic transmission according to claim 4, wherein
when the actual input rotation speed of the multi-speed automatic transmission is lower than a synchronous rotation speed of a highest-speed gear shift position at the time of return from coasting running due to the depressing operation of the accelerator pedal, the first engagement control portion delays selection of the selected gear shift position until the actual input rotation speed of the multi-speed automatic transmission becomes equal to or greater than the synchronous rotation speed of the highest-speed gear shift position.

9. The control device of a vehicle including a multi-speed automatic transmission according to claim 1, wherein
the target gear shift position is decided from a shift diagram stored in advance based on an actual vehicle speed and a drive power request amount at the time of return from the coasting running due to the depressing operation of the accelerator pedal.

10. The control device of a vehicle including a multi-speed automatic transmission according to claim 2, wherein
the target gear shift position is decided from a shift diagram stored in advance based on an actual vehicle speed and a drive power request amount at the time of return from the coasting running due to the depressing operation of the accelerator pedal.

11. The control device of a vehicle including a multi-speed automatic transmission according to claim 3, wherein
the target gear shift position is decided from a shift diagram stored in advance based on an actual vehicle speed and a drive power request amount at the time of return from the coasting running due to the depressing operation of the accelerator pedal.

12. The control device of a vehicle including a multi-speed automatic transmission according to claim 4, wherein
the target gear shift position is decided from a shift diagram stored in advance based on an actual vehicle speed and a drive power request amount at the time of return from the coasting running due to the depressing operation of the accelerator pedal.

13. The control device of a vehicle including a multi-speed automatic transmission according to claim 5, wherein
the target gear shift position is decided from a shift diagram stored in advance based on an actual vehicle speed and a drive power request amount at the time of return from the coasting running due to the depressing operation of the accelerator pedal.

14. The control device of a vehicle including a multi-speed automatic transmission according to claim 6, wherein
the target gear shift position is decided from a shift diagram stored in advance based on an actual vehicle speed and a drive power request amount at the time of return from the coasting running due to the depressing operation of the accelerator pedal.

15. The control device of a vehicle including a multi-speed automatic transmission according to claim 7, wherein
the target gear shift position is decided from a shift diagram stored in advance based on an actual vehicle speed and a drive power request amount at the time of return from the coasting running due to the depressing operation of the accelerator pedal.

16. The control device of a vehicle including a multi-speed automatic transmission according to claim 8, wherein
the target gear shift position is decided from a shift diagram stored in advance based on an actual vehicle speed and a drive power request amount at the time of return from the coasting running due to the depressing operation of the accelerator pedal.

* * * * *